Sept. 12, 1961     E. D. RITCHIE     2,999,714
DUAL-POSITION HANDLE FOR CONTAINERS
Filed Sept. 17, 1956
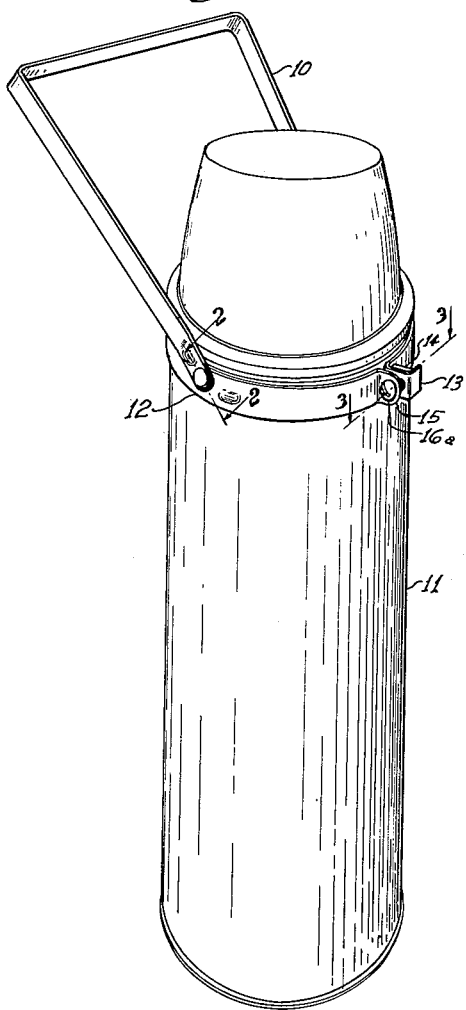
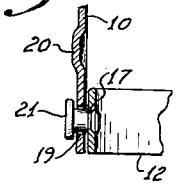
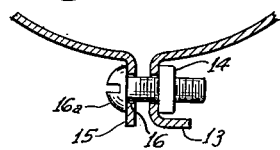
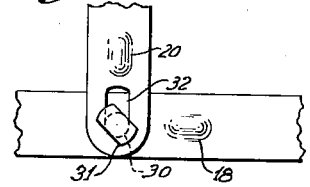
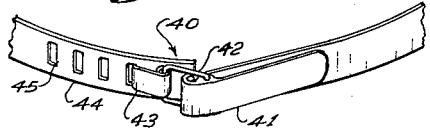

United States Patent Office 2,999,714
Patented Sept. 12, 1961

2,999,714
DUAL-POSITION HANDLE FOR CONTAINERS
Ernest D. Ritchie, 6349 E. Barnan, Tucson, Ariz.
Filed Sept. 17, 1956, Ser. No. 610,370
1 Claim. (Cl. 294—31.2)

This invention relates to new and useful improvements in a handle for a container.

Some containers, such, for example, as large vacuum bottles are difficult to lift, carry, or pour the contents therefrom. The present invention provides a dual-position handle for a container which is simple of design, compact and easy to manipulate.

An object of the invention is the provision of a bail to be employed to lift and carry containers.

Another object is to provide a bail to be manipulated to, and locked in, a side position and cradle a container thereby making it easier to pour the contents therefrom.

A further object is to provide a bail which is simple in design, easy to manufacture and marketable at a nominal price.

Another object of the invention is to provide a bail for a container which may be readily and easily attached thereto.

Further objects and advantages will become apparent upon reference to the specification and drawings. In the drawings similar characters of reference represent corresponding parts in the several views.

FIGURE 1 is a perspective view of one form of the invention.

FIGURE 2 is a sectional view, partly in elevation, taken along line 2—2 of FIGURE 1 showing one embodiment of a pivotal attachment for securing a bail to a band on a container.

FIGURE 3 is a sectional view taken along line 3—3 of FIG. 1 showing one embodiment of a band fastening means.

FIGURE 4 is a side elevation showing a second embodiment of a pivotal attachment for securing a bail to a band on a container.

FIGURE 5 is a perspective view showing a second embodiment of a band fastening means.

The container to which the handle is shown attached is, for purposes of illustration and not of limitation, a vacuum bottle of the usual form. The improved handle, however, will work equally well with any container.

The bail 10 is attached to a container 11 by means of a strip or band 12 which is preferably flat and of thin material so as to reduce to a minimum the cost of the bail attaching means. As shown in FIGURES 1 and 3, band 12 is provided at one end with a first outwardly extending portion 13 fitted with a tapped nut 14, and is provided at the other end with a second outwardly extending portion 15 fitted with a screw or bolt receiving perforation 16. The band 12 is secured to container 11 by means of a bolt 16a which is inserted through perforation 16 and tightened into nut 14. The band 12, at diametrically opposite points, is provided with perforations 17 (FIGURE 2) and protuberances 18, the function of which will be hereinafter described.

The bail 10 is in the form of a thin strip of metal or other suitable material, has a grip portion and perpendicular legs as shown, and has a perforation 19 near the end of each leg. Also, at diametrically opposite points, the bail 10 has depressions 20 and is flared outwardly near said depressions 20.

The bail 10 is attached to band 12 by inserting the rivets 21 through the perforations 19 in the bail and the perforations 17 in the band.

The top of bail 10, when in an upright position, is substantially flat and parallel to the plane of the top of the container 11. This provides a comfortable grip portion for ease in carrying the container 11 and also provides a flat surface when the bail 10 is used as a cradle for ease in pouring the contents from container 11.

FIGURE 4 shows a second embodiment of a pivot for bail 10 wherein each pivot 30 has an elongated flat head 31 and the bail has an elongated slot 32 at each end. When the bail is rotated so that the longitudinal axis of slot 32 lines up with the longitudinal axis of the head 31, the bail is easily removed from the band 12 by springing the ends of the bail outwardly past the elongated heads 31.

FIGURE 5 shows a second embodiment of a band fastening means which is designed for quick and easy removal of the bail assembly from the container. The fastening means 40 consists of the lever 41, link 42 and band engaging hook 43. The lever 41 is pivotally connected to one end of band 44 as shown. The other end of the band is provided with slots 45. One end of link 42 is pivotally connected to lever 41 as shown. The other end of link 42 is pivotally connected to hook 43. When lever 41 is in a raised position and hook 43 is engaging slot 45, the band 44 forms a circle of larger circumference than container 11. The band assembly may then be slipped over one end of the container. Lever 41 is then lowered which shortens the effective length of link 42 and tightens band 44 around the container.

The bail 10 is used as a cradle for pouring from the container 11 by rotating bail 10 approximately 90 degrees to a side position. In this position, the protuberances 18 engage the depressions 20. The bail is then firmly held in its side position. The bail is preferably of sufficient length so that the top of the container is elevated when the flat portion of bail 10 engages some plane surface, such as a table top.

In using the bail in a side position as a cradle, it was found that the bail, which extends approximately three inches above the top of the cup on a container similar to the one shown in FIG. 1, elevated the end of a full container enough to prevent the contents from issuing therefrom after the first cup was filled. Thereafter, the container remained in a pouring position on the bail. The next cup was filled by simply placing it under the upper end of the container and elevating the lower end until the cup was full. The lower end of the container was then quickly lowered and the flow stopped without dripping. Thus, it is seen that the invention provides, inter alia, a device which permits dispensing liquids from a container with a minimum of effort.

While the invention has been illustrated and described in certain detail for illustrative purposes, it will be apparent to persons skilled in the art that certain modifications and details of construction may be incorporated therein without departing from the spirit and scope of the appended claim.

I claim:

A combined handle and pouring-cradle for a vacuum bottle comprising a substantially flat horizontal grip portion, a leg depending from each end of said grip portion, a depression and a perforation near one end of each leg, a circular band, protuberances and perforations at diametrically opposite points of said band, pivots connecting said legs to said band through said first and last mentioned perforations, said depressions and said protuberances being so designed and located as to engage one another when said legs are rotated about said pivots, and means for tightening said band around said vacuum bottle, characterized by the fact that said legs are of sufficient length to support said vacuum bottle in a tilted position when said legs are rotated about said pivots to a horizontal position, whereby the open end of said bottle is sufficiently elevated to prevent the contents from pouring therefrom after the first cupful has been removed from said bottle.

References Cited in the file of this patent

UNITED STATES PATENTS

| | | |
|---|---|---|
| 1,026,093 | Johnson | May 14, 1912 |
| 1,146,334 | Lehman et al. | July 13, 1915 |
| 1,227,629 | Kloepper | May 29, 1917 |
| 1,539,201 | Ottow | May 26, 1925 |
| 1,765,072 | Hashimoto | June 17, 1930 |
| 2,300,744 | Jenkins | Nov. 3, 1942 |
| 2,441,892 | Mattoon | May 18, 1948 |
| 2,632,666 | Cunningham | Mar. 24, 1953 |
| 2,740,655 | Maly | Apr. 3, 1956 |
| 2,759,756 | Sikora | Aug. 21, 1956 |